United States Patent [19]

Tozier et al.

[11] 4,341,817
[45] Jul. 27, 1982

[54] FLASHLAMP CONTAINMENT COATING

[75] Inventors: John E. Tozier; John W. Shaffer, both of Williamsport, Pa.

[73] Assignee: GTE Products Corporation, Stamford, Conn.

[21] Appl. No.: 263,657

[22] Filed: May 14, 1981

[51] Int. Cl.³ .............................................. B05D 3/06
[52] U.S. Cl. .................................. 427/54.1; 427/106; 427/425; 427/430.1; 431/360
[58] Field of Search ................... 427/54.1, 425, 430.1, 427/443.2, 106; 431/360

[56] References Cited

U.S. PATENT DOCUMENTS

| | | | |
|---|---|---|---|
| 3,953,626 | 4/1976 | Suzuki et al. | 427/425 |
| 3,956,540 | 5/1976 | Laliberte et al. | 427/443.2 |
| 4,076,489 | 2/1978 | Schroeter et al. | 427/54.1 |
| 4,197,333 | 4/1980 | Leach et al. | 427/54.1 |
| 4,207,356 | 6/1980 | Waugh | 427/425 |
| 4,232,058 | 11/1980 | Dow et al. | 427/54.1 |

FOREIGN PATENT DOCUMENTS 1143708  2/1963  Fed. Rep. of Germany ...... 431/360

*Primary Examiner*—John H. Newsome
*Attorney, Agent, or Firm*—Thomas H. Buffton

[57] ABSTRACT

A process for applying a protective light-transmitting coating to a photoflash lamp comprising the steps of applying the protective coating to the lamp and curing the applied coating by exposure thereof to radiant energy and characterized by the improvement wherein the layer of coating applied to some portions of the photoflash lamp is thicker than the layer of coating applied to other portions of the photoflash lamp.

10 Claims, 3 Drawing Figures

4,341,817

FLASHLAMP CONTAINMENT COATING

TECHNICAL FIELD

This invention relates to photoflash lamps and more particularly to a structure and process wherein a greater thickness of protective light transmitting coating is applied to failure-prone areas of a photoflash lamp whereby containment capabilities of the photoflash lamp are enhanced.

BACKGROUND ART

A typical photoflash lamp comprises a hermetically sealed glass envelope, a quantity of combustible material located in the envelope, such as shredded zirconium or hafnium foil, and a combustion supporting gas, such as oxygen, at a pressure well above one atmosphere. The lamp also includes an electrically or percussively activated primer for igniting the combustible material to flash the lamp. During lamp flashing, the glass envelope is subject to severe thermal shock due to hot globules of metal oxide impinging on the walls of the lamp. As a result cracks and crazes occur in the glass and, at higher internal pressures, containment becomes impossible. In order to reinforce the glass envelope and improve its containment capability, it has been common practice to apply a protective lacquer coating on the lamp envelope by means of a dip process. To build up the desired coating thickness, the glass envelope is generally dipped a number of times into resin, typically cellulose acetate. After each dip, the lamp is dried to evaporate the solvent and leave the desired coating of cellulose acetate, or whatever other plastic resin is employed.

Another approach to providing a more economical and improved containing vessel is described in U.S. Pat. No. 3,893,797, wherein a thermoplastic coating, such as polycarbonate, is vacuum formed onto the exterior surface of the glass envelope. The method of applying the coating comprises: placing the glass envelope within a preformed sleeve of the thermoplastic material; drawing a vacuum in the space between the thermoplastic sleeve and the glass envelope; and simultaneously heating the assembly incrementally along its length, whereby the temperature and vacuum cause the thermoplastic to be incrementally formed onto the glass envelope with the interface substantially free of voids, inclusions and the like. Although this method provides an optically clear protective coating by means of a significantly faster and safer manufacturing process which may be easily integrated on automated producted machinery, it does present the disadvantage of requiring preformed plastic sleeves which must be individually designed for each different lamp type, made or purchased, stocked, and fed into the production apparatus which applies the sleeves onto the envelopes.

Further approaches toward providing improved protective coatings of lamps are described in the aforementioned Dow et al patent applications, which relate to coatings including UV curable photopolymers. For example, in the Dow et al application Ser. No. 753,255, a method of coating a flashlamp with a photopolymer is described comprising the following steps. First, the lamp is held vertically with the press up and dipped into a vat of the photopolymer at 60° C. and extracted very slowly, the dip process taking about 45 seconds. The resulting coating thickness is about 0.020 inch. According to an alternative method described in the same Dow et al application, the flashlamp, while revolving, is sprayed with the liquid photopolymer and then transferred directly into the ultraviolet lamp chamber. Dow et al application Ser. No. 699,139 is somewhat similar except that either long or short strands of fiber glass are employed to reinforce the photopolymer coating.

An immersion process for applying a UV-cured coating on a photoflash lamp is also described in a published Japanese patent application identified as Public Disclosure Number 52-7720 and having a publication date of Jan. 21, 1977; the corresponding U.S. application Ser. No. 592,194, filed June 17, 1976 was abandoned, and a continuation of a continuation-in-part thereof issued as U.S. Pat. No. 4,076,489 on Feb 28, 1978.

A somewhat critical aspect of the aforementioned UV-cured coatings is that the shape and uniformity of thickness depends on the flow characteristics of the photopolymer resin as influenced by the force of gravity, orientation of the lamp after coating, and viscosity of the resin. Change in resin viscosity resulting from changes in temperature affect both the repeatability of the shape of the coating and the uniformity of thickness. These irregularities are retained once the coating is hardened. In the case of UV-cured coatings used to protect flashlamps from rupture at the time of flashing, thin coating regions resulting from improper resin distribution can result in containment failures. The comparative integrity or containment for various types of vessel constructions can be evaluated by the use of special test lamps, such as described in U.S. Pat. No. 3,955,912 assigned to the present assignee, which controllably induce bursting of the lamp upon ignition.

In another aspect, U.S. Pat. No. 4,197,333 issued to Leach et al suggests a flow-dispensing method for applying a containment coating to a flashlamp envelope. This flow-dispensing method includes the steps of: holding the lamp with its longitudinal axis disposed horizontally and rotating the lamp about its longitudinal axis; flow-dispensing a liquid photopolymer coating material having a viscosity during application in the range of 3000 to 5000 centipoise onto the envelope of the rotating lamp from dispensing means located above the lamp; and allowing the coating on the lamp envelope to be cure-hardened. Preferably, the rotating lamp is held in a fixed position below a fixed dispensing means having a plurality of needles through which the liquid coating material is dispensed. The needles are arranged along the length of the lamp and spaced a substantially fixed distance above a surface profile of the lamp envelope. The method is particularly useful for applying photopolymer coatings on lamps which are subsequently cure-hardened by irradiation with a source of ultraviolet light.

Rotation of the horizontally disposed lamp while coating material is dispensed from a plurality of selectively disposed needles located above the lamp exhibits surprising effectiveness in stabilizing the coating shape, once applied, for periods of up to thirty seconds prior to exposure for cure-hardening. This method is particularly effective for overcoming the viscosity characteristics encountered when using coating material of UV-curable photopolymers. Further, the complete coating can be applied in from one to four revolutions of the lamp, which is about 0.6 second or less. Uniform, repeatable coatings can be applied at production line speeds, and when applied to photoflash lamps, the resulting protectively coated vessel exhibits a superior containment capability, along with excellent photometric characteristics. In addition to the above-mentioned improvements in the resulting product, the method of applying lamp coatings according to the invention provides several advantages to the lamp manufacturing process. For example, the process can be solvent free; it requires a minimum of floor space; and it can be readily adapted to automated lamp production apparatus. Further, cure time is reduced to periods of less than a minute. A hard cure is effected immediately, without the need for warehousing to assure a complete cure.

However, it is to be noted that the envelope of the more common flashlamp configurations tend to exhibit portions which are more prone to failure than other portions. For example, the glass-to-metal sealing area of the flashlamp, usually referred to as the press portion, includes one or more electrical conductors which pass through and are sealed into the glass envelope. Thus, the glass is "worked" in this press portion causing undesired stresses and rendering the press portion more failure-prone than those areas which are not significantly altered or "worked".

Additionally, it is to be noted that areas of increased stress in the flashlamp are encountered due to the structural configuration. Specifically, the positional location of the ignition means and combustible materials within the envelope of the flashlamp tend to exert increased stresses and strains on the adjacent press portion. Thus, the "worked" press portion plus additional forces such as impinging glass particles tend to build undesired stress into the press portion of the flashlamp. Moreover, such stress areas in the press portion tend to be more failure-prone than other portions of the lamp which necessitates added containment capabilities for these failure-prone areas.

SUMMARY OF THE INVENTION

An object of the invention is to provide a photoflash lamp with enhanced containment capabilities. Another object of the invention is to improve the failure-prone portions of a photoflash lamp. Still another object of the invention is to improve the containment capability of the failure-prone portions of a photoflash lamp by utilizing a containment coating of non-uniform thickness. A further object of the invention is to provide a process for applying a non-uniform thickness of containment coating to a photoflash lamp.

These and other objects, advantages and capabilities are achieved in one aspect of the invention by a photoflash lamp coating process wherein a protective light-transmitting coating is applied to the outer surface of the flashlamp and cured and wherein a different thickness of coating is applied to different portions of the photoflash lamp.

In another aspect of the invention, a protective light-transmitting coating is applied to the outer surface of a photoflash lamp and cured with the coating applied in a non-uniform amount to different portions of the photoflash lamp to provide a thicker coating on the failure-prone portions than on other portions of the photoflash lamp.

BEST MODE FOR CARRYING OUT THE INVENTION

For a better understanding of the present invention, together with other and further objects, advantages and capabilities thereof, reference is made to the following disclosure and appended claims in conjunction with the accompanying drawings.

Figure 1:
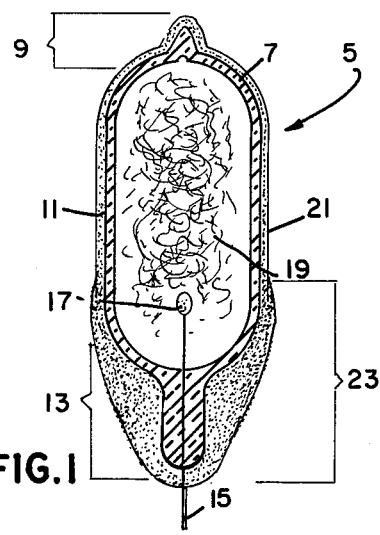
FIG. 1 is a diagrammatic illustration of a photoflash lamp showing the uneven containment coating of the invention.

Referring to the drawings, FIG. 1 diagrammatically illustrates a photoflash lamp 5 having a glass envelope 7 with a tip portion 9, a body portion 11 and a press portion 13. At least one electrical conductor 15 is sealed into and passes through the press portion 13 of the envelope 7 and an ignition means 17 is affixed to the electrical conductor 15 and adjacent the press portion 13 of the envelope 7. Also, a combustible material 19, such as zirconium shreds for example, is distributed throughout the interior of the envelope 7. Moreover, the envelope 7 encloses an atmosphere, such as oxygen, at a pressure greater than atmospheric pressure.

Affixed to the outer surface of the glass envelope 7 is a protective light-transmitting coating 21. Preferably, but not necessarily, the coating is a UV-curable material, such as a photopolymer or radiation curable resin, for example. Polyesters, epoxy acrylates, acrylics and polyurethanes along with a photosensitizer such as benzoin ether are materials suitable to the above-mentioned light-transmitting coating 21.

As previously mentioned, the glass envelope 7 includes portions which are failure-prone as compared with the remainder of the glass envelope 7. One particular failure-prone portion of the glass envelope 7, as previously mentioned, is the press portion 13. There, the glass of the envelope 7 is "worked" and stressed to provide a seal for the envelope 7 as well as a seal for the electrical conductor 15 passing therethrough. Also, the ignition means 17, upon energization, tends to undesirably provide hot globules of metal oxide which impinge and shock the envelope 7 in the vicinity of the press portion 13.

Upon review and study of failure-prone areas of a photoflash lamp 5, it has been found that containment capabilities are enhanced by providing a protective light-transmitting coating 23 at the failure-prone areas of the glass envelope 7. Although the press portion 13 has been found to be the most obvious failure-prone portion of the glass envelope 7 and, therefore, the portion most in need of a protective light-transmitting coating of increased thickness 23, it is to be understood that a coating of increased thickness 23 is also suitable to other failure-prone portions of a photoflash lamp 5. For instance, the tip portion 9 may exhibit failure-prone characteristics as compared with the body portion 11 and would, therefore, be a candidate for a protective light-transmitting coating.

Figure 2:
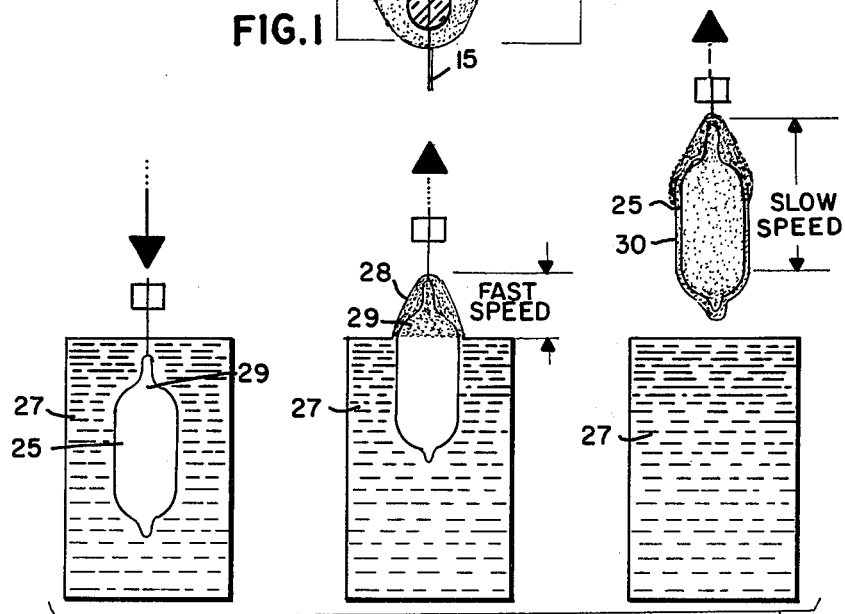
FIG. 2 is a diagrammatic illustration of a process for effecting the uneven containment coating of FIG. 1.

As to a photoflash lamp coating process, it has been noted that certain portions, preferably failure-prone portions, of the photoflash lamp need a greater thickness of coating than other portions of the lamp. One process for effecting the above-mentioned variations in coating thickness is illustrated in FIG. 2. Therein a photoflash lamp 25 is immersed in a coating material 27 such as a UV-curable resin. A failure-prone portion 29, such as the press portion, of the photoflash lamp 25 is withdrawn at a relatively rapid speed from the coating material 27. In this manner, a relatively thick layer 28 of coating material 27 surrounds the failure-prone portion 29 of the photoflash lamp 25. Thereafter, the remainder of the photoflash lamp 25 is withdrawn from the coating material 27 at a relatively slow speed. Thus, the remainder of the photoflash lamp 25 has a relatively thin layer 30 of coating material 27 as compared with the failure-prone portion 29. Thereafter, the coating is cured to provide the desired containment covering for the photoflash lamp.

Figure 3:
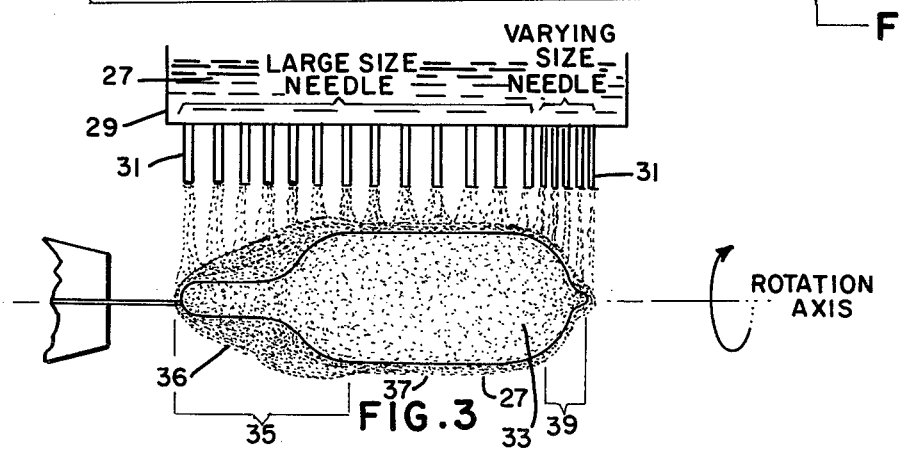
FIG. 3 is an alternative illustration of a process for providing an uneven containment coating thickness on a photoflash lamp.

FIG. 3 illustrates still another aspect of the invention. Therein, a coating material 27, such as a UV-curable resin is disposed within a pressurized container 29. Affixed to and extending outwardly from the container 29 is a plurality of hollow needles 31 of varying sizes. A photoflash lamp 33 having a press portion 35, a body portion 37 and a tip portion 39 is spaced from the hollow needles 31 and rotatable about a longitudinal axis.

More specifically, about 19 to 20 hollow needles 31 of a size in the range of about 21 to 20 gauge and having a spacing therebetween of about 0.0560 inch are distributed along the longitudinal axis of a photoflash lamp 33 which is about one inch in length. The hollow needles 31 are positioned in the range of about 0.030 to 0.060 inch above the rotating photoflash lamp 33 and provide a layer of coating material 27 on the body portion 37 of the photoflash lamp 33 of a thickness of about 0.025 inch. Typically, the coating material 27 is deposited onto the photoflash lamp 33 in about one to four revolutions of the lamp in about 0.3 to 0.6 seconds. Thereafter, the coating material 27 is cured in air in about 25 seconds.

In one particular example, it was found that a change in needle size from 21 gauge to 20 gauge for the needles which deposit the coating material onto the press portion 35 provided a result similar to the previously-described non-uniform rate dip process. In other words, altering the needle size provides a thicker layer of coating 36 on the press portion 35 of the photoflash lamp 33 than the coating layer 27 on the body portion 37.

Thereafter, the coated photoflash lamp 33 is cured for about 25 seconds utilizing a UV-source such as a GTE lamp no. FR40T12 producing a peak wavelength of about 350 nanometers. Moreover, flash tests on over 1000 regular production lamps utilizing the above-mentioned containment coating resulted in neither noise nor rupture of any of the lamps.

While there has been shown and described what is at present considered the preferred embodiments of the invention, it will be obvious to those skilled in the art that various changes and modifications may be made therein without departing from the invention as defined by the appended claims.

INDUSTRIAL APPLICABILITY

An enhanced photoflash lamp and fabrication process wherein a light transmitting protective coating is applied to the outer surface of the lamp in a manner to improve the containment capabilities of the lamp. The protective coating is applied to provide a thicker layer of coating on failure-prone portions of the lamp than on the remaining portions of the lamp. As a result, coating costs are reduced while containment capability is increased. Moreover, processes are provided for effecting the above-described non-uniform coating distribution which not only reduce the operational cost and space required to effect the coating process but also reduce the hazard and expense of the coating operation.

We claim:

1. A process for coating a photoflash lamp with a UV-curable resin including the steps of applying varying amounts of UV-curable resin to different portions of the photoflash lamp and curing said UV-curable resin by impingement thereof with energy from a radiant energy source, said process characterized by the improvement wherein a different thickness of said UV-curable coating is applied to different portions of said photoflash lamp by a dip-coating process wherein said photoflash lamp is withdrawn from the coating composition at a non-uniform rate.

2. The process of claim 1 wherein said photoflash lamp includes an interconnecting tip portion, body portion and press portion with a coating of a greater thickness applied to said press portion than to said tip and body portions of said photoflash lamp.

3. The process of claim 1 wherein said photoflash lamp includes a tip portion, body portion and press portion with at least one of said portions being more failure-prone than the other portions and a thicker coating of UV-curable material applied to said failure-prone portion than to said other remaining portions of said photoflash lamp.

4. The process of claim 1 wherein said photoflash lamp includes tip, body and press portions with more than one of said portions prone to failure wherein a thicker coating of UV-curable material is applied to said failure-prone areas than to said remaining areas of said photoflash lamp.

5. The process of claim 1 wherein said applying of varying amounts of UV-curable coating is effected by a dip-coating process where said lamp is withdrawn from said coating at a non-uniform rate to provide a different thickness of coating on different portions of said photoflash lamp.

6. The process of claim 2 wherein said applying of varying amounts of UV-curable coating to different portions of said lamp is effected by a dip-coating process wherein said lamp is withdrawn from a coating at a non-uniform rate to provide an increased thickness of coating on said press portion as compared with said tip and body portions of said photoflash lamp.

7. In a process for applying a protective light-transmitting coating to the exterior surface of a photoflash lamp which includes the steps of varying the amount of coating applied to the various portions of the lamp and curing the applied protective light-transmitting coating, the improvement wherein dip-coating of the photoflash lamp is utilized to provide a different thickness of coating on different portions of the photoflash lamp by withdrawing said photoflash lamp from the coating composition at a non-uniform rate.

8. In the process of claim 7 wherein said photoflash lamp includes tip, body and press portions with at least one of said portions being more failure-prone than the other portions, the improvement characterized by the application of a thicker layer of protective light-transmitting coating on said more failure-prone portions than on said other portions.

9. In the process of claim 7 wherein said photoflash lamp includes tip, body and press portions with said press portion being more prone to failure than said tip and body portions, the improvement wherein a thicker layer of protective light-transmitting coating is applied to said press portion than to said tip and body portions of said photoflash lamp.

10. In the process of claim 7 wherein said applying of a protective light-transmitting coating to the exterior surface of a photoflash lamp is effected by a dip-coating process, the improvement wherein said lamp is withdrawn from said coating at a non-uniform rate to provide a photoflash lamp with different lamp portions having a different coating thickness.

* * * * *